(No Model.)

M. H. McNAIR.
WRENCH.

No. 255,182. Patented Mar. 21, 1882.

Witnesses:
L. Barr
J. L. Rossiter

Inventor:
Milton H. McNair

UNITED STATES PATENT OFFICE.

MILTON H. McNAIR, OF MEADVILLE, PENNSYLVANIA.

WRENCH.

SPECIFICATION forming part of Letters Patent No. 255,182, dated March 21, 1882.

Application filed August 24, 1880. (No model.)

*To all whom it may concern:*

Be it known that I, MILTON H. MCNAIR, of the city of Meadville, in the county of Crawford and State of Pennsylvania, have invented an Improved Differential Self-Adjusting Wrench, the object being to hold or turn cylindrical-shaped bodies of different sizes without readjusting.

Figure 1:
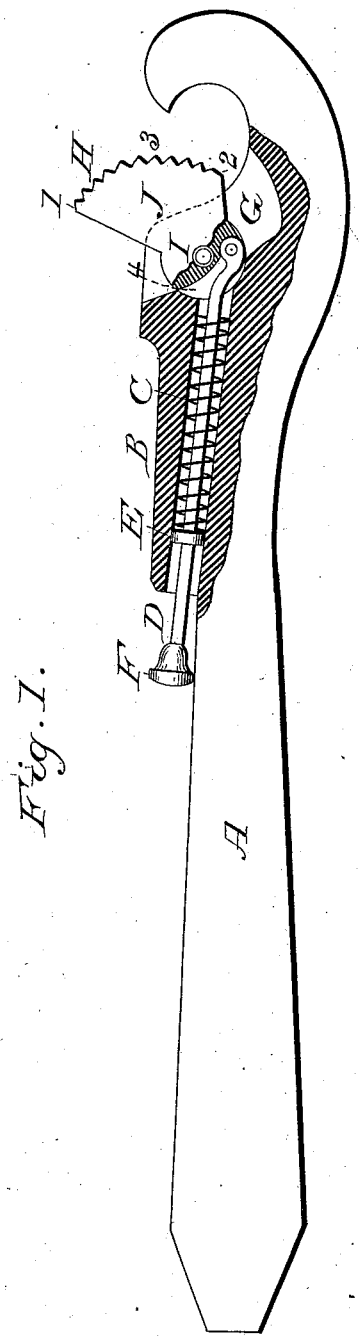
Figure 2:
Figure 3:
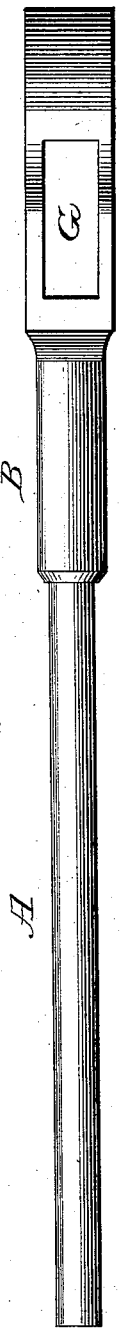

Figure 1 is a longitudinal section of lever A with a curved end having casing B on the upper side to receive spring C and lever D with guide E and button F, and having recess G to receive serrated-faced cam H. Fig. 2 is a top view of the cam, rod, and spring, and Fig. 3 a top view of the handle.

I is the wheel or center of cam H, which, in connection with recess G in lever A, forms a knuckle-joint, 4, with a pin to keep it in place, and having lever D connected on the under side, and having a recess to allow lever D to free itself when passing the center. J is a projection of cam H, which is long at 1 and short at 2, having a curved line from 1 to 2, as shown.

Operation: Button F is pressed forward, which causes lever D to throw cam H back to allow the cylindrical body to be held or turned to enter the curved end of lever A. The pressure is then released, and spring C, resting against lever A at one end and against guide E on lever D at the other, throws cam H forward, and the serrated face comes in contact with the body. As lever A is raised the cam is more firmly embedded. This is caused by the cam being constructed so as to cause an increase in length from the point of contact with the body. The same action occurs in holding and turning cylindrical bodies of different sizes.

I claim—

The combination and arrangement of lever A with recess G and casing B, spring C, lever D, guide E, button F, and serrated-faced cam H, forming with recess G the knuckle-joint 4, as and for the purpose set forth.

MILTON H. McNAIR.

Witnesses:
T. L. ROSSITER,
L. BARR.